United States Patent
Barad et al.

(10) Patent No.: US 10,176,186 B2
(45) Date of Patent: Jan. 8, 2019

(54) SYSTEMS AND METHODS FOR DETECTING MATCHING CONTENT IN CODE FILES

(71) Applicant: Tata Consultancy Services Limited, Mumbai (IN)

(72) Inventors: Vishal Barad, Gandhinagar (IN); Manojkumar Ghanshyamdas Rochani, Bloomington, MN (US)

(73) Assignee: Tata Consultancy Services Limited, Mumbai (IN)

( * ) Notice: Subject to any disclaimer, the term of this patent is extended or adjusted under 35 U.S.C. 154(b) by 362 days.

(21) Appl. No.: 15/018,501

(22) Filed: Feb. 8, 2016

(65) Prior Publication Data

US 2017/0169045 A1 Jun. 15, 2017

(30) Foreign Application Priority Data

Dec. 11, 2015 (IN) .......................... 4663/MUM/2015

(51) Int. Cl.
   - *G06F 7/00* (2006.01)
   - *G06F 17/30* (2006.01)
   - *G06F 8/75* (2018.01)
   - *G06F 8/70* (2018.01)

(52) U.S. Cl.
   CPC .......... *G06F 17/30109* (2013.01); *G06F 8/70* (2013.01); *G06F 8/751* (2013.01); *G06F 17/3071* (2013.01); *G06F 17/30076* (2013.01); *G06F 17/30598* (2013.01)

(58) Field of Classification Search
   None
   See application file for complete search history.

(56) References Cited

U.S. PATENT DOCUMENTS

| | | | |
|---|---|---|---|
| 7,260,501 B2 | 8/2007 | Pattipatti et al. | |
| 8,433,472 B2 | 4/2013 | Singh et al. | |
| 8,498,776 B2 | 7/2013 | Singh et al. | |
| 8,676,432 B2 | 3/2014 | Patnaik et al. | |
| 2005/0114840 A1* | 5/2005 | Zeidman | G06F 8/71 717/126 |
| 2010/0011013 A1* | 1/2010 | Singh | G06F 17/30327 707/E17.006 |
| 2010/0241469 A1* | 9/2010 | Weigert | G06F 8/75 717/124 |
| 2011/0320876 A1* | 12/2011 | Klein | G06F 8/33 714/38.1 |
| 2012/0117082 A1* | 5/2012 | Koperda | G06F 17/30657 707/748 |
| 2015/0331941 A1* | 11/2015 | Defouw | G10L 25/51 707/687 |

* cited by examiner

*Primary Examiner* — Tuan A Pham
(74) *Attorney, Agent, or Firm* — Finnegan, Henderson, Farabow, Garrett & Dunner LLP

(57) ABSTRACT

Methods systems for detecting of matching content in code files are provided. The method involves generating clusters of code files based on a degree of matching characters contained in each of the code files. A first cluster of code files is identified based on the code files having 100% matching hash codes and at least one second cluster is generated based on a character count generated for the code files that are not part of the first cluster and having a degree of match equal to or greater than a pre-determined percentage match. Such identified first cluster and at least one second cluster of code files are reported to have matching content based on the associated degree of match.

7 Claims, 2 Drawing Sheets

US 10,176,186 B2

SYSTEMS AND METHODS FOR DETECTING MATCHING CONTENT IN CODE FILES

PRIORITY CLAIM

This U.S. patent application claims priority under 35 U.S.C. § 119 to: India Application No. 4663/MUM/2015 filed on 11 Dec. 2015. The entire contents of the aforementioned application are incorporated herein by reference.

TECHNICAL FIELD

The embodiments herein generally relate to systems and methods for comparing source codes for detecting matching content.

BACKGROUND

With easy access to a large amount of resources available today, it is imperative that every work is subjected to a plagiarism check to ensure that it is original and does not infringe any author's copyright. In case of code files containing computer programs, besides making sure that there is no infringement, such checks may also be employed to debug the code. With evolving technology and attempts being made to enhance or develop new technology, there is no dearth of computer languages. It is a challenge to provide a common tool that not only makes checking for matching content quick, but also ensures that it can be employed for checking code files of any computer language. It becomes humanly impossible to manually check source codes for matching content when the volumes are large. For instance, when assessing trainees, one may need to assess codes submitted by tens of thousands of trainees. Such voluminous assessment, besides being time consuming, is also technically impossible considering the varying syntax requirements for each type of computer language that is not easily decipherable by the human eye.

SUMMARY

Embodiments of the present disclosure present technological improvements as solutions to one or more of the above-mentioned technical problems recognized by the inventors in conventional systems.

In an aspect, there is provided a computer implemented method comprising identifying a first cluster of code files, the first cluster representing code files having matching hash codes; generating a character count for characters contained in each of the code files that are not part of the first cluster; computing a degree of match of each code file with every other code file based on the generated character count; and identifying at least one second cluster of code files based on the computed degree of match of the character count.

In an embodiment, identifying a first cluster further comprises: processing received code files by eliminating white spaces and new lines contained therein; converting characters contained in the processed code files to upper case characters; and generating hash code for the converted characters associated with the corresponding received code files.

In an embodiment, the generated count associated with each of the converted characters is stored in a character count dictionary.

In an embodiment, computing a degree of match comprises computing (i) a first percentage match representing a ratio of character count in a code file for each character with character count for each matching character in every other code file; and (ii) a second percentage match representing a ratio of total number of matched characters based on the first percentage match and total number of unique characters in the compared code files.

In an embodiment, the at least one second cluster represents code files having matching content, wherein the computed first percentage match and the computed second percentage match are both equal to or greater than a predetermined value.

In an embodiment, the method described herein above further comprises reporting the first cluster and the at least one second cluster.

In another aspect, there is provided a system comprising: one or more internal data storage devices for storing instructions; and one or more processors operatively coupled to the one or more internal data storage devices, the one or more processors being configured by the instructions to execute: a complete match cluster creator configured to identify a first cluster of code files, the first cluster representing code files having matching hash codes; a character count generator configured to a generate character count for characters contained in each of the code files that are not part of the first cluster; a match computer configured to compute a degree of match of each code file with every other code file based on the generated character count; and a percentage match cluster creator configured to identify at least one second cluster of code files based on the computed degree of match of the character count.

In an embodiment, the system described herein above further comprises a match reporter configured to report the first cluster and the at least one second cluster.

In an embodiment, the one or more internal data storage devices are further configured to store the first cluster and the at least one second cluster.

In yet another aspect, there is provided a computer program product comprising a non-transitory computer readable medium having a computer readable program embodied therein, wherein the computer readable program, when executed on a computing device, causes the computing device to: identify a first cluster of code files, the first cluster representing code files having matching hash codes; generate a character count for characters contained in each of the code files that are not part of the first cluster; compute a degree of match of each code the with every other code file based on the generated character count; and identify at least one second cluster of code files based on the computed degree of match of the character count.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
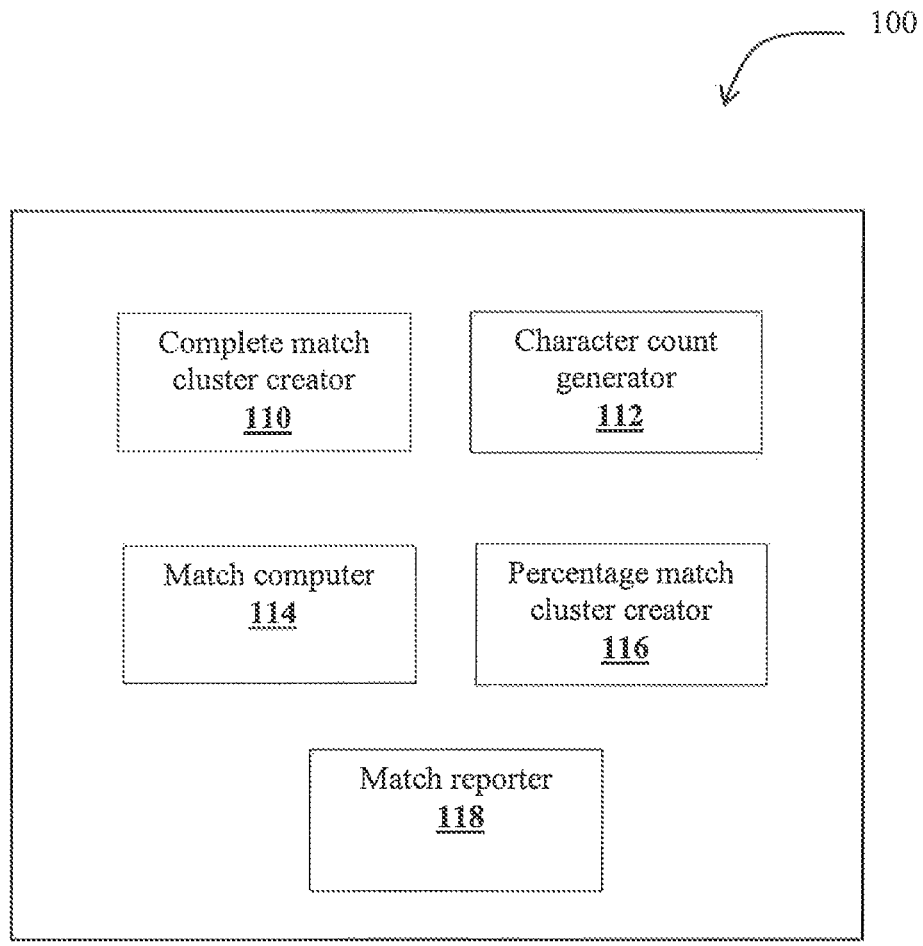
FIG. 1 illustrates an exemplary block diagram of a system for detecting matching content in code files in accordance with an embodiment of the present disclosure.
Figure 2:
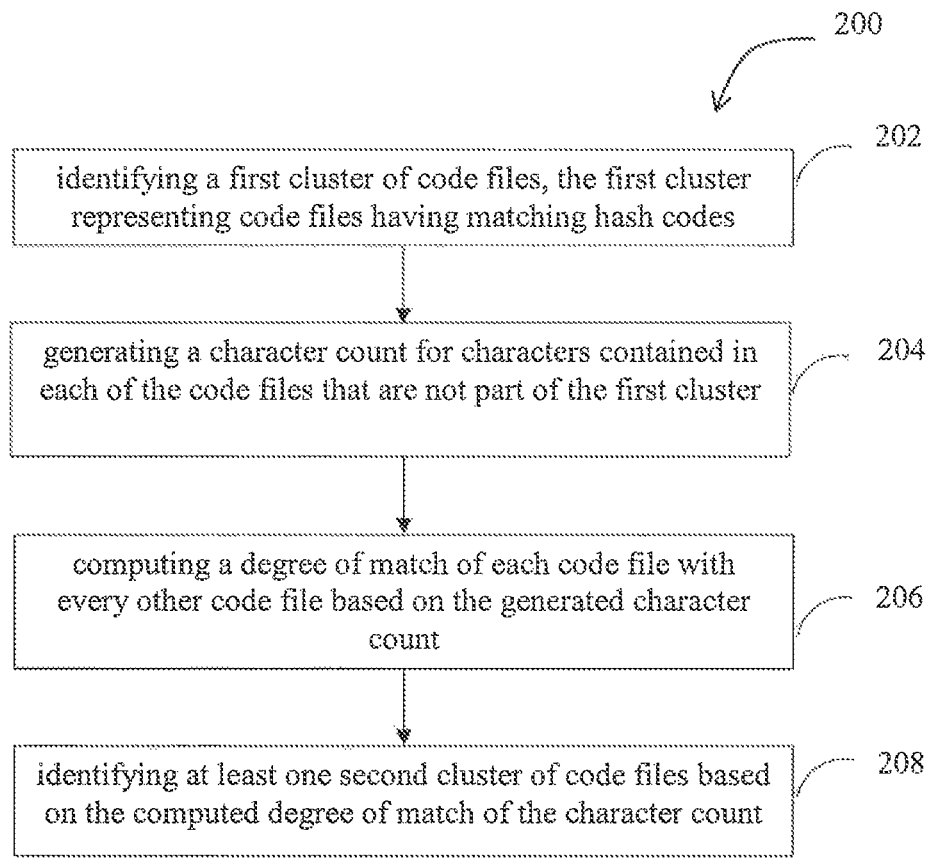
FIG. 2 illustrates an exemplary flow diagram of a computer implemented method for detecting matching content in code files using the system of FIG. 1 in accordance with an embodiment of the present disclosure.

Referring now to the drawings, and more particularly to FIGS. 1 and 2, where similar reference characters denote corresponding features consistently throughout the figures, there are shown preferred embodiments and these embodiments are described in the context of the following exemplary system and method.

The expression "code files " in the context of the present disclosure refers to source codes and object codes of computer programs. Accordingly, "code files" refer to files written in computer programming languages and also compiled output files of a compiler associated with computer programming languages.

FIG. 1 illustrates an exemplary block diagram of a system 100 for detecting matching content in code files in accordance with an embodiment of the present disclosure and FIG. 2 illustrates an exemplary flow diagram of a computer implemented method 200 for detecting matching content in code files using the system of FIG. 1 in accordance with an embodiment of the present disclosure. In an embodiment, the system 100 includes one or more processors (not shown), communication interface device or input/output (I/O) interface (not shown), and memory or one or more internal data storage devices (not shown) operatively coupled to the one or more processors. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented on a server or in a variety of computing systems, such as a laptop computer, a desktop computer, a notebook, a workstation, a mainframe computer, a server, a network server, cloud, hand-held device and the like.

The I/O interface can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the various modules of the system 100 can be stored in the memory.

Systems and methods of the present disclosure facilitate detecting matching content in code files. This may be required for various reasons such as detecting plagiarism, debugging code and the like. Particularly in scenarios wherein the code files available are in large numbers, it is practically impossible to detect matching content manually. Besides being time consuming, it is virtually impossible for the human eye to detect matching content considering the varying syntax requirements of code files. Systems and methods of the present disclosure automate this process not only to speed up a time consuming activity but also provide a tool that is independent of the programming language employed thereby proving to be an adaptable and agile tool for detecting matching content in code files for any computer language. Besides detecting a 100% match between code files, systems and methods of the present disclosure also enable detecting any pre-defined percentage match between code files to identify minor differences between code files which may be missed when checking for 100% match.

The steps of the method 200 of the present disclosure will now be explained with reference to the components of the system 100 as depicted in FIG. 1. In an embodiment, at step 202, a complete match cluster creator 110 receives code files and screens them to identify code files having matching hash codes. Such identified code files can be part of a first cluster and represent 100% match between the identified code files. In an embodiment, the step 202 can include cleansing of the code files by eliminating while spaces and new lines contained in the code files and then converting the characters to upper case characters. Hash codes are then generated for the converted characters for comparing and identify the first cluster of code files with 100% matching hash codes.

At step 204, a character count generator 112 generates a character count for characters contained in each of the code files that are not part of the first cluster. Accordingly, a character count is generated for each of the code files that did not have a 100% match with any other code file. In an embodiment, the generated count associated with each of the converted characters can be stored in a character count dictionary for each of the received code files.

At step 206, a match computer 114 computes a degree of match of each code file with every other code file based on the generated character count. In an embodiment, computing a degree of match involves computing (i) a first percentage match representing a ratio of character count in a code file for each character with character count for each matching character in every other code file; and (ii) a second percentage match representing a ratio of total number of matched characters based on the first percentage match and total number of unique characters in the compared code files.

At step 208, a percentage match cluster creator 116 identifies one or more second clusters of code files based on the computed degree of match of the character count. In an embodiment, the one or more second cluster includes code files having matching content wherein the computed first percentage match and the computed second percentage match are both equal to or greater than a pre-determined value.

In an embodiment, the system 100 can comprise a match reporter 118 that can report the first cluster and the one or more second clusters.

In an exemplary embodiment, the system of the present disclosure was tested using 2 Java code files to detect matching content wherein the pre-determined value for degree of match is say at least 80%. The code files included programming code to compute an average of odd numbers in a list or array of numbers.

File 1 Code:

```
public class Operations
{
    public double findAverageOfOddNumbers(int[ ] values)
    {
        double result = 0;
        for(int i = 0;i<values.length;i++)
        {
            if(values[i]%2 != 0)
            {
                result += values[i];
            }
        }
        return result/values.length;
    }
}
```

File 2 Code:

```
public class Operations
{
    public double findAverageOfOddNumbers(int[ ] val)
    {
        double res = 0;
        for(int i = 0;i<val.length;i++)
        {
            if(val[i]%2 != 0)
            {
                res += val[i];
            }
        }
        return res/val.length;
    }
}
```

It may be noted that expressions "values and result" in File 1 code was replaced by "val and res" in File 2 code.

In an embodiment, hash codes were generated using standard MD5 algorithm as follows
Hash Code of File 1 code=23812218624916265147107984624670155438 5157
Hash Code of File 2 code=13218714948252551211163119723761151 74246

A character matching matrix generated was generated as below:

| | File1.Java (File1 code) | | File2.Java (File2 code) | | |
|---|---|---|---|---|---|
| No. | Character | Count | Character | Count | MATCH % |
| 1 | 0 | 3 | 0 | 3 | 100 |
| 2 | 0 | 2 | 0 | 2 | 100 |
| 3 | 0 | 3 | 0 | 3 | 100 |
| 4 | 2 | 1 | 2 | 1 | 100 |
| 5 | ; | 5 | ; | 5 | 100 |
| 6 | ! | 1 | ! | 1 | 100 |
| 7 | ( | 3 | ( | 3 | 100 |
| 8 | ) | 3 | ) | 3 | 100 |
| 9 | [ | 3 | [ | 3 | 100 |
| 10 | ] | 3 | ] | 3 | 100 |
| 11 | { | 4 | { | 4 | 100 |

-continued

| | File1.Java (File1 code) | | File2.Java (File2 code) | | |
|---|---|---|---|---|---|
| No. | Character | Count | Character | Count | MATCH % |
| 12 | } | 4 | } | 4 | 100 |
| 13 | / | 1 | / | 1 | 100 |
| 14 | % | 1 | % | 1 | 100 |
| 15 | < | 1 | < | 1 | 100 |
| 16 | = | 4 | = | 4 | 100 |
| 17 | A | 9 | A | 9 | 100 |
| 18 | B | 5 | B | 5 | 100 |
| 19 | C | 3 | C | 3 | 100 |
| 20 | D | 5 | D | 5 | 100 |
| 21 | E | 12 | E | 17 | 70 |
| 22 | F | 4 | F | 4 | 100 |
| 23 | G | 3 | G | 3 | 100 |
| 24 | H | 2 | H | 2 | 100 |
| 25 | I | 12 | I | 12 | 100 |
| 28 | L | 12 | L | 15 | 80 |
| 27 | M | 1 | M | 1 | 100 |
| 28 | N | 8 | N | 8 | 100 |
| 29 | O | 7 | O | 7 | 100 |
| 30 | P | 3 | P | 3 | 100 |
| 31 | R | 9 | R | 9 | 100 |
| 32 | S | 7 | S | 12 | 58 |
| 33 | T | 6 | T | 9 | 67 |
| 34 | U | 6 | U | 14 | 43 |
| 35 | V | 6 | V | 6 | 100 |

The hash codes for File 1 code and File 2 code do not match due to the modified expressions of "values" and "result". Accordingly, since File 1 code and File 2 code do not have a 100% match, they do not form part of the first cluster.

In an embodiment, the above character matching matrix with the generated character count can be stored in a character count dictionary.

Based on the % match above, it is seen that 31/35 characters have a first percentage match equal to or greater than 80% (30 characters having 100% match and character "L" having 80% match). Thus the second percentage match is 31/35 or 89% match which is greater than the pre-determined value of 80%. Since the first percentage match and the second percentage match are greater than the pre-determined value of 80%, in this instance, the File 1 code and File 2 code files can be identified as a second cluster having code files having at least 80% match, Similarly, when comparing more number of files, other second clusters may be identified having varying pre-determined degree of match.

In another exemplary embodiment, the system of the present disclosure was tested using 2 SQL code files to detect matching content wherein the pre-determined value for degree of match is again at least 80%. The SQL code shared in both the files represents selection of records, from associated database tables, with data of trainee's attempts to solve assignment problems. The SQL code files compute total attempts by each trainee grouped by trainee's name and employee id through joining of three associated tables viz. TBL_TRAINEE (table containing trainee details like employee id, name, etc.), TBL_LG (table containing learning group details where trainees are batched) and TBL_ATTEMPT (table containing attempt details by each trainee for each assignment question).

File 1 code:
SELECT sum(a.ATTEMPT_COUNT), T.EMP_ID, T.NAME FROM TBL_ATTEMPT A JOIN TBL_TRAINEE T ON t.EMP_ID=a.EMP_ID JOIN tbl_lg L ON l.LG_ID=t.LG_ID WHERE L.LG_ID=40050 GROUP BY T.EMP_ID, T.NAME ORDER BY sum (a.ATTEMPT_COUNT);

File 2, code:
SELECT sum(X.ATTEMPT_COUNT), T.EMP_ID, T.NAME FROM TBL_ATTEMPT X JOIN TBL_TRAINEE T ON t.EMP_ID=X.EMP_ID JOIN tbl_lg L ON l.LG_ID=t.LG _ID WHERE L.LG_ID=40050 GROUP BY T.EMP_ID, T.NAME ORDER BY sum (X.ATTEMPT_COUNT);

In an embodiment, hash codes were generated using standard MD5 algorithm as follows Hash Code of File 1 code=02472101198258322454122991931201771921 42

Hash Code of File 2 code= 170213952101855624430261562623518313111 3255

A character matching matrix generated was generated as below:

| No. | File1.SQL (File 1 code) | | File2.SQL (File 2 code) | | MATCH % |
|---|---|---|---|---|---|
| | Character | Count | Character | Count | |
| 1 | S | 3 | S | 3 | 100.00% |
| 2 | E | 16 | E | 16 | 100.00% |
| 3 | L | 11 | L | 11 | 100.00% |
| 4 | C | 3 | C | 3 | 100.00% |
| 5 | T | 23 | T | 23 | 100.00% |
| 6 | U | 5 | U | 5 | 100.00% |
| 7 | M | 12 | M | 12 | 100.00% |
| 8 | ( | 2 | ( | 2 | 100.00% |
| 9 | A | 10 | A | 6 | 60% |
| 10 | 0 | 11 | 0 | 11 | 100.00% |
| 11 | P | 8 | P | 8 | 100.00% |
| 12 | - | 12 | - | 12 | 100.00% |
| 13 | O | 9 | O | 9 | 100.00% |
| 14 | N | 9 | N | 9 | 100.00% |
| 15 | ) | 2 | ) | 2 | 100.00% |
| 16 | , | 3 | , | 3 | 100.00% |
| 17 | | | 10 | | | 10 | 100.00% |
| 18 | D | 8 | D | 8 | 100.00% |
| 19 | F | 1 | F | 1 | 100.00% |
| 20 | R | 6 | R | 6 | 100.00% |
| 21 | B | 5 | B | 5 | 100.00% |
| 22 | J | 2 | J | 2 | 100.00% |
| 23 | = | 3 | = | 3 | 100.00% |
| 24 | G | 5 | G | 5 | 100.00% |
| 25 | W | 1 | W | 1 | 100.00% |
| 26 | H | 1 | H | 1 | 100.00% |
| 27 | 4 | 1 | 4 | 1 | 100.00% |
| 28 | 0 | 3 | 0 | 3 | 100.00% |
| 29 | 5 | 1 | 5 | 1 | 100.00% |
| 30 | Y | 2 | Y | 2 | 100.00% |
| 31 | ; | 1 | ; | 1 | 100.00% |
| 32 | X | 0 | X | 4 | 0% |

The hash codes for File 1 code and File 2 code do not match and hence they do not form part of the first cluster.

Based on the % match above, it is seen that 30/32 characters have a first percentage match greater than 80%. Thus the second percentage match is 30/32 or 94% match which is greater than the pre-determined value of 80%. Since the first percentage match and the second percentage match are greater than the pre-determined value of 80%, the File 1 code and File 2 code files can be identified as a second cluster having code files having at least 80% match. Similarly, when comparing more number of files, other second clusters may be identified having varying pre-determined degree of match.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e,g, an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for detecting matching content in code files, the method comprising:
   identifying, by a processor, a first cluster of code files, the first cluster representing code files having matching hash codes, wherein identifying the first cluster comprises:
     processing received code files by eliminating white spaces and new lines contained therein;
     converting characters contained in the processed code files to upper case characters; and
     generating the hash code for the converted characters associated with the corresponding received code files;
   generating, by the processor, a character count for all characters contained in each of the remaining code files that are not part of the first cluster of code files;
   computing, by the processor, a degree of match of each remaining code file that is not part of the first cluster of code files, with every other remaining code file that is not part of the first cluster of code files, based on the generated character count, wherein computing a degree of match comprises computing:
     (i) a first percentage match representing a ratio of character count in a code file for each character with character count for each matching character in every other code file; and
     (ii) a second percentage match representing a ratio of total number of matched characters based on the first percentage match and total number of all characters in every other compared code file; and
   identifying, by the processor, at least one second cluster of code files that are not part of the first cluster of code files, based on the computed degree of match of the character count for all characters, wherein the at least one second cluster represents code files having matching content, and wherein the computed first percentage match and the computed second percentage match are both equal to or greater than a pre-determined percentage degree of match.

2. The computer implemented method of claim 1 further comprising storing the generated count associated with each of the converted characters in a character count dictionary.

3. The computer implemented method of claim 1 further comprising reporting the first cluster and the at least one second cluster.

4. A system for detecting matching content in code files, the system comprising:
   one or more internal data storage devices for storing instructions; and
   one or more processors operatively coupled to the one or more internal data storage devices, the one or more processors being configured by the instructions to execute:
     a complete match cluster creator configured to identify a first cluster of code files, the first cluster representing code files having matching hash codes, wherein identifying the first cluster comprises:
       processing received code files by eliminating white spaces and new lines contained therein;
       converting characters contained in the processed code files to upper case characters; and
       generating the hash code for the converted characters associated with the corresponding received code files;
     a character count generator configured to a generate character count for all characters contained in each of the remaining code files that are not part of the first cluster of code files;
     a match computer configured to compute a degree of match of each remaining code file that is not part of the first cluster of code files, with every other remaining code file that is not part of the first cluster of code files, based on the generated character count, wherein computing a degree of match comprises computing:
       (i) a first percentage match representing a ratio of character count in a code file for each character with character count for each matching character in every other code file; and
       (ii) a second percentage match representing a ratio of total number of matched characters based on the first percentage match and total number of all characters in every other compared code file; and
     a percentage match cluster creator configured to identify at least one second cluster of code files that are not part of the first cluster of code files, based on the computed degree of match of the character count for all characters, wherein the at least one second cluster represents code files having matching content, and wherein the computed first percentage match and the computed second percentage match are both equal to or greater than a pre-determined percentage degree of match.

5. The system of claim 4 further comprising a match reporter configured to report the first cluster and the at least one second cluster.

6. The system of claim 4, wherein the one or more internal data storage devices are further configured to store the first cluster and the at least one second cluster.

7. A computer program product for detecting matching content in code files, the product comprising a non-transitory computer readable medium having a computer readable program embodied therein, wherein the computer readable program, when executed on a computing device, causes the computing device to:
   identify a first cluster of code files, the first cluster representing code files having matching hash codes, wherein identifying the first cluster comprises:
     processing received code files by eliminating white spaces and new lines contained therein;
     converting characters contained in the processed code files to upper case characters; and generating the hash code for the converted characters associated with the corresponding received code files;

generate a character count for all characters contained in each of the remaining code files that are not part of the first cluster of code files;

compute a degree of match of each remaining code file that is not part of the first cluster of code files with every other remaining code file that is not part of the first cluster of code files, based on the generated character count, wherein computing a degree of match comprises computing:
  (i) a first percentage match representing a ratio of character count in a code file for each character with character count for each matching character in every other code file; and
  (ii) a second percentage match representing a ratio of total number of matched characters based on the first percentage match and total number of all characters in every other compared code file; and identify at least one second cluster of code files that are not part of the first cluster of code files, based on the computed degree of match of the character count for all characters, wherein the at least one second cluster represents code files having matching content, and wherein the computed first percentage match and the computed second percentage match are both equal to or greater than a pre-determined percentage degree of match.

\* \* \* \* \*